(12) United States Patent
Olivadese et al.

(10) Patent No.: US 11,126,776 B2
(45) Date of Patent: *Sep. 21, 2021

(54) COHERENT PLACEMENT OF SLOTLINE MODE SUPPRESSION STRUCTURES IN COPLANAR WAVEGUIDES FOR QUANTUM DEVICES

(71) Applicant: International Business Machines Corporation, Armonk, NY (US)

(72) Inventors: Salvatore Bernardo Olivadese, Stamford, CT (US); Vivekananda P. Adiga, Ossining, NY (US); Jared Barney Hertzberg, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/840,930

(22) Filed: Apr. 6, 2020

(65) Prior Publication Data
US 2020/0233996 A1 Jul. 23, 2020

Related U.S. Application Data

(63) Continuation of application No. 16/039,597, filed on Jul. 19, 2018, now Pat. No. 10,664,640.

(51) Int. Cl.
*G06F 30/392* (2020.01)
*G06F 30/20* (2020.01)
(Continued)

(52) U.S. Cl.
CPC ............ *G06F 30/392* (2020.01); *G06F 30/20* (2020.01); *G06N 10/00* (2019.01); *G06F 2119/10* (2020.01)

(58) Field of Classification Search
USPC ........................................................ 716/122
See application file for complete search history.

(56) References Cited

U.S. PATENT DOCUMENTS

| 5,905,654 A | 5/1999 | Tanino et al. |
| 6,759,742 B2 | 7/2004 | Budka |

(Continued)

OTHER PUBLICATIONS

Non-Final Office Action received for U.S. Appl. No. 16/039,597 dated Sep. 17, 2019, 16 pages.

(Continued)

*Primary Examiner* — Bryce M Aisaka
(74) *Attorney, Agent, or Firm* — Amin, Turocy & Watson, LLP

(57) ABSTRACT

A system includes a memory that stores computer executable components, and a processor executes the computer executable components stored in the memory. The computer executable components comprise: an assessment component that determines locations for mode suppression structures on a coplanar waveguide of a quantum chip having qubits; a simulation component that simulates performance of the quantum chip based on a subset of the locations for the mode suppression structures and parameters of the quantum chip, and generates a mode suppression structures placement model. A template component generates a template of specific coordinates for placement of a subset of the mode suppression structures on the quantum chip based on the mode suppression structures placement model; and a driver component employs the template to drive an auto-bonder to install the subset of the mode suppression structures on the quantum chip at the specific coordinates.

20 Claims, 9 Drawing Sheets

(51) Int. Cl.
    *G06F 119/10*    (2020.01)
    *G06N 10/00*     (2019.01)

(56) References Cited

U.S. PATENT DOCUMENTS

| | | |
|---|---|---|
| 7,665,056 B1 | 2/2010 | Lockman et al. |
| 7,990,237 B2 | 8/2011 | Margomenos et al. |
| 8,754,722 B2 | 6/2014 | Choi et al. |
| 8,762,917 B2 | 6/2014 | Pekarek et al. |
| 9,893,262 B2 | 2/2018 | Thompson et al. |
| 10,235,634 B1 * | 3/2019 | Chen .................. G06N 10/00 |
| 2012/0216164 A1 | 8/2012 | Graf et al. |
| 2017/0373365 A1 | 12/2017 | U-yen et al. |

OTHER PUBLICATIONS

Haijie et al., "Experimental demonstrations of high-Q superconducting coplanar waveguide resonators", Chinese Science Bulletin, Jul. 2013, vol. 58 No. 20, pp. 2413-2417.

Chen et al., "Fabrication and characterization of aluminum airbridges for superconducting microwave circuits", Applied Physics Letters 104, 052602 (2014), 4 pages.

Wenner et al., "Wirebond crosstalk and cavity modes in large chip mounts for superconducting qubits", Last Accessed: Apr. 9, 2018, 13 pages.

List of IBM Patents or Applications Treated as Related.

* cited by examiner

MSS PLACEMENT SIMULATION RESULTS

COHERENT PLACEMENT OF SLOTLINE MODE SUPPRESSION STRUCTURES IN COPLANAR WAVEGUIDES FOR QUANTUM DEVICES

BACKGROUND

The subject disclosure relates generally to automated coherent placement of mode suppression structures (MSS) in coplanar waveguides for quantum devices.

Conventional systems and methods attempt to place MSS components such as wire-bonds on a quantum chip, but these systems/methods do not bridge respective tasks, e.g., design, simulation and prototype phases, required to achieve a goal of efficient placement to mitigate issues such as cross-talk and resonance across MSS components. The state of the art provides basic guidelines for wire-bond placement, but does not address how to proceed consistently across design, simulation and prototype phases. There are also systems/methods that provide like guidelines for via and substrates but again do not follow a complete design to implementation scheme. The herein described embodiments address the foregoing issues with the state of the art. The techniques described here are particularly advantageous for quantum devices as compared to classical electronics where component placement is not as critical to chip performance

SUMMARY

The following presents a summary to provide a basic understanding of one or more embodiments of the invention. This summary is not intended to identify key or critical elements, delineate scope of particular embodiments or scope of claims. Its sole purpose is to present concepts in a simplified form as a prelude to the more detailed description that is presented later. In one or more embodiments described herein, systems, computer-implemented methods, apparatus and/or computer program products that facilitate automated coherent placement of mode suppression structures in coplanar waveguides for quantum devices are provided.

In some embodiments, a system comprises: a memory that stores computer executable components; and a processor that executes computer executable components stored in the memory. The computer executable components comprise: an assessment component that determines locations for mode suppression structures on a coplanar waveguide of a quantum chip having qubits; a simulation component that simulates performance of the quantum chip based on a subset of the locations for the mode suppression structures and parameters of the quantum chip, and generates a mode suppression structures placement model. The computer executable components also comprise: a template component that generates a template of specific coordinates for placement of the subset of mode suppression structures on the quantum chip based on the mode suppression structures placement model; and a driver component that employs the template to drive an auto-bonder to install the subset of the mode suppression structures on the quantum chip at the specific coordinates. An advantage of the embodiment can comprise of avoiding building multiple physical prototypes repeatedly until clear performance results are achieved. This embodiments simulation component can potentially eliminate that possibility.

In some embodiments, the simulation component determines crosstalk and resonant frequencies as a function of mode suppression structure placement within desired operating ranges for the quantum chip. An advantage of the embodiment is achieving acceptable circuit performance with minimal noise associated with a fabricated quantum chip.

In some embodiments, the locations of the mode suppression structures are defined in the design layout as a function of rules associated with properties of the mode suppression structures, waveguides and the quantum chip. An advantage of the embodiment is identifying initial close proximities to final locations of the mode suppression structures to reduce number of simulations.

In some embodiments, a tape-out set of coordinates is generated corresponding to the locations of the mode suppression structures from the design layout and the simulation component, and the tape-out set of coordinates are employed by the auto-bonder to physically place respective mode suppression structures. An advantage of the embodiment is inserting the mode suppression structures precisely on the chip as directed by the coordinates with less than 0.1-micron deviation from the target.

In some embodiments, a computer-implemented method, comprises: determining, by a device operatively coupled to a processor, locations for mode suppression structures on a coplanar waveguide of a quantum chip; simulating, by the device, performance of a quantum chip based on a subset of the mode suppression structures locations and parameters of the quantum chip, and generate a mode suppression structures placement model; generating, by the device, a template of specific coordinates for placement of the subset of mode suppression structures on the quantum chip based on the mode suppression structures model; and employing, by the device, the template to drive an auto-bonder to install respective mode suppression structures on the quantum chip at the specific coordinates defined by the template. An advantage of the embodiment is utilization of a methodology to produce consistent mode suppression structures locations after every design without significant process deviation.

In some embodiments the defining, by the device, of the locations for the mode suppression structures in the design layout as a function of rules associated with properties of the mode suppression structures, the coplanar waveguide and the quantum chip provide an advantage of achieving a comprehensive analysis of listed components and potential to optimize mode suppression structures locations during an initial design phase.

In some embodiments, a computer program product comprising a computer readable storage medium having program instructions embodied therewith is provide. The program instructions executable by processor to cause the processor to: determine locations for mode suppression structures on a coplanar waveguide of a quantum chip; simulate performance of the quantum chip based on a subset of the mode suppression structures locations and parameters of the quantum chip, and generate a mode suppression structures mode suppression structures model; generate a template of specific coordinates for placement of the subset of MSS on the quantum chip based on the MSS model; and employ the template to drive an auto-bonder to install respective mode suppression structures on the quantum chip at the specific coordinates defined by the template.

DETAILED DESCRIPTION

Figure 1:
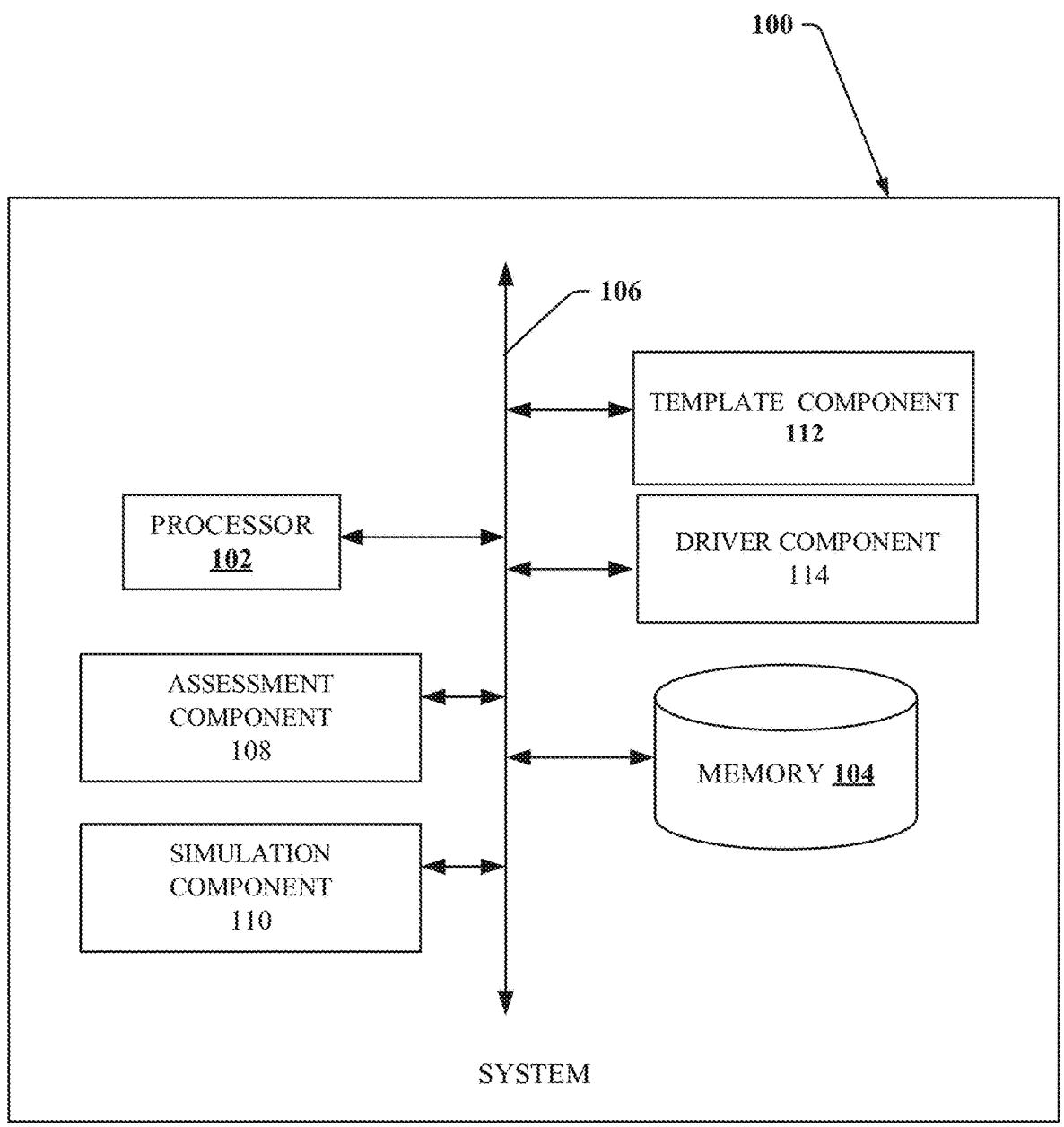
FIG. 1 illustrates a block diagram of an example system implemented that can access data and process that data using variable computing components depicted in accordance with one or more embodiments described herein.

The following detailed description is merely illustrative and is not intended to limit embodiments and/or application or uses of embodiments. Furthermore, there is no intention to be bound by any expressed or implied information presented in the preceding Summary section, or in the Detailed Description section. One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident; however, in various cases, that the one or more embodiments can be practiced without these specific details.

Coplanar Waveguides (CPW) are used extensively for implementation of transmission line resonators in quantum devices due to design simplicity and low losses. Transmission line resonators are based on CPW to obtain very high (e.g., in the range of $10^6$) quality factor, Q. Ideally, one or more resonators should support only one mode (e.g., resonance) with very high Q; however, CPW have additional modes called "slotline modes" (e.g., noise), which lower the performance of the quantum device interfering with quantum components as well. For one or more embodiments, accurate placement of "slotline modes" suppressing structures (MSS) can be important for quantum devices due to sensitivity to minute variations in electrical signals. Such sensitivity is a problem that does not typically exist in classical electronics to the extent as in quantum devices; thus, the subject disclosed embodiments provide a solution for quantum devices relating to optimizing placement of respective mode suppression structures.

In CPW, a central metallic conductor on a dielectric substrate is placed between two ground planes and the primary electromagnetic mode is symmetric between ground planes and assumes equal potential on both. When this condition is violated, a slotline mode appears, which is typically caused by a voltage difference between ground planes, leading to additional losses and undesired interaction with qubits. This is because according to design, qubits should couple to a single mode resonant cavity. Additional modes will degrade quantum performances. In an effort to avoid introducing slotline modes, it is sufficient to keep the two ground planes at a same potential leveraging on additional MSS, like wire bonds (simple wires added after tape-out on the chip), air-bridges (implemented during a fabrication process) or Through Silicon Vias (TSV).

Mode suppression structures placed manually during one or more steps of a design flow can lead to considerable variation in measurements with regard to simulation results. The locations of mode suppression structures changes according to resonator shape (e.g., meandered or straight lines) and technology (e.g., wire bond material, air-bridges manufacturing, and TSV geometry). This means that depending on respective locations of these slotline Modes Suppression Structures (MSS), CPW resonator performances might change, and microwave simulations needed to address this problem. Quantum devices are extremely sensitive and MSS placement might affect performances in a significant way. Therefore, it can be beneficial to reproduce the same position for one or more of the MSS in one or more steps of a design flow (e.g., layout drawing (e.g., design), simulation, fabrication (e.g., tape-out) and post-tape-out).

One or more embodiments described herein can have two significant aspects. First, a simple and general method to define MSS positions for CPW. Second, a procedure to export exactly MSS locations to design, simulation and layout files. Several advantages of herein described embodiments as compared to current strategies are: simplicity as a unique description for any possible Modes Suppression Structures (MSS) in CPW is provided and can be exported to most any step of a design and verification flow; accuracy as positioning of MSS can be controlled with great accuracy and is coherent among different software and files by construction, leading to agreement between simulations and measurements; and flexibility as the methodology covers most mode suppression structures, and can be easily extended to new future mode suppression structures. A problem with conventional systems/methods is that there is no clear way to consistently locate MSS with precision throughout an entire design to fabrication process. The herein described embodiments maintain consistency and repeatability through the aforementioned processes.

One or more embodiments herein have a process flow as follows. First starting at a design phase, the mode suppression structures changes can be strategically positioned on quantum chip drawings based on technical requirements and guidelines. Then the entire design can be imported into a simulation package that can verify if the design features meet intended goals of the corresponding quantum circuit (e.g., is crosstalk and resonator losses within a specific tolerance) and are acceptable. If the design features do not meet the intended goals or are not acceptable, the MSS placement can be modified and the simulation process with the new design can be executed again as an iterative process. If the goals are met, a physical prototype of the chip can be built (e.g., tape-out) automatically using scripts (e.g., tested with Ruby in Klayout) as needed to accommodate fabrication parameters. The MSS (wire bonds or air bridges) can be added using coordinates provided to an auto-bonder machine.

FIG. 1 illustrates a block diagram of an example system 100 implemented that can access data and process data using variable computing components depicted in accordance with one or more embodiments described herein. The system 100 can facilitate a process of assessing and identifying a large amount of various forms of data, and using machine learning, training a neural network or other type of model. The system 100 can also generate predictive recommendations to an individual level resulting in a context in accordance with one or more embodiments described herein. Aspects of systems (e.g., system 100 and the like), apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. Repetitive description of like elements employed in one or more embodiments described herein is omitted for sake of brevity.

System 100 can optionally include a server device, one or more networks and one or more devices (not shown). The system 100 can also include or otherwise be associated with at least one processor 102 that executes computer executable components stored in memory 104. The system 100 can further include a system bus 106 that can couple various components including, but not limited to, an assessment component 108, a simulation component 110, a template component 112, and a driver component 114. The system 100 can be any suitable computing device or set of computing devices that can be communicatively coupled to devices, non-limiting examples of which can include, but are not limited to, a server computer, a computer, a mobile computer, a mainframe computer, an automated testing system, a network storage device, a communication device, a web server device, a network switching device, a network routing device, a gateway device, a network hub device, a network bridge device, a control system, or any other suitable computing device. A device can be any device that can communicate information with the system 100 and/or any other suitable device that can employ information provided by system 100. It is to be appreciated that system 100, components, models or devices can be equipped with communication components (not shown) that enable communication between the system, components, models, devices, etc. over one or more networks.

In accordance with the system 100, a memory 104 can store computer executable components executable by the processor 102. The assessment component 108 can determine locations for MSS on a coplanar waveguide of a quantum chip. The assessment component 108 can also select locations of the MSS to enhance the performance of the quantum chip signal along with mitigating crosstalk noise and reducing resonator losses.

If during verification crosstalk or an impact on qubits performance is detected (details later), distance between MSS is reduced by half (e.g., and the number of MSS is consequently increased). Specific locations of the MSS can be defined in the design layout as a function of rules associated with properties of the MSS, coplanar waveguides and the quantum chip. Given the frequency, FR, (which is defined by the CPW line length), MSS are initially placed (automatically in the layout) at a distance of lambda/10 (where lambda ($\Lambda$) is the wavelength at the resonator frequency FR) between each other along the CPW line implementing the resonator.

The simulation component 110 can simulate performance of a quantum chip based on a subset of the MSS locations and parameters of the quantum chip. During simulation two parameters can be evaluated:

Crosstalk between resonators: if the slotline mode of one resonator is visible in the Scattering parameters (power waves) of another resonator more MSS are needed.

Qubits quality factor Q (measure of the strength of the damping of its oscillations): is affected by the location of slotline modes on coupled resonators. If Q is lower than 1e7 additional MSS are needed, e.g., distance between them is reduced by half until qubits Q reaches 1e7. The simulation component 110 can generate a MSS placement model. This component also determines if the placement of the mode suppression structures satisfies the design specifications and determines if the crosstalk and resonant frequencies as a function of mode suppression structures placement are within desired operating ranges for the quantum chip.

The template component 112 generates a template of specific coordinates for placement of the subset of mode suppression structures on the quantum chip based on the mode suppression structures model. As a pseudo-code implementation consider this: Inputs 2D layout, reference. For all MSS in the layout DO, get MSS x, y coordinates and export list of x, y coordinates into a file. The template component 112 also generates the template of specific coordinates in a graphic database system (GDS) file format where the distance between mode suppression structures is a function of frequency of qubits of the quantum chip. It is to be appreciated that GDS is just one example format, and embodiments described herein are not limited to GDS format; any suitable format can be implemented. This template comprises of sets of squares respectively associated with respective mode suppression structures and x and y coordinates of the respective squares that are exported to the auto-bonder for targeted placement of the respective mode suppression structures. Along with these functions, the template component 112 comprises a plurality of layers that respectively correspond to the design layout, the simulation model layout and the physical layout.

The driver component 114 can employ the template to drive an auto-bonder to install respective mode suppression structures on the quantum chip at locations defined by the template. In some embodiments, the auto-bonder places respective mode suppression structures at desired locations with less than 0.1-micron deviation from a target location based on a tape-out set of coordinates generated corresponding to locations of the mode suppression structures from the design layout and simulation component 110. These tape-out sets of coordinates can be employed by the auto-bonder to physically place respective mode suppression structures.

The various components of system 100 can be connected either directly or via one or more networks. Such networks can include wired and wireless networks, including, but not limited to, a cellular network, a wide area network (WAN) (e.g., the Internet), or a local area network (LAN), non-limiting examples of which include cellular, WAN, wireless fidelity (Wi-Fi), Wi-Max, WLAN, radio communication, microwave communication, satellite communication, optical communication, sonic communication, or any other suitable communication technology. Moreover, the aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components can be combined into a single component providing aggregate functionality. The components can also interact with one or more other components not specifically described herein for the sake of brevity, but known by those of skill in the art.

The subject computer processing systems, methods apparatuses and/or computer program products can be employed to solve new problems that arise through advancements in technology, computer networks, the Internet and the like.

Figure 2:
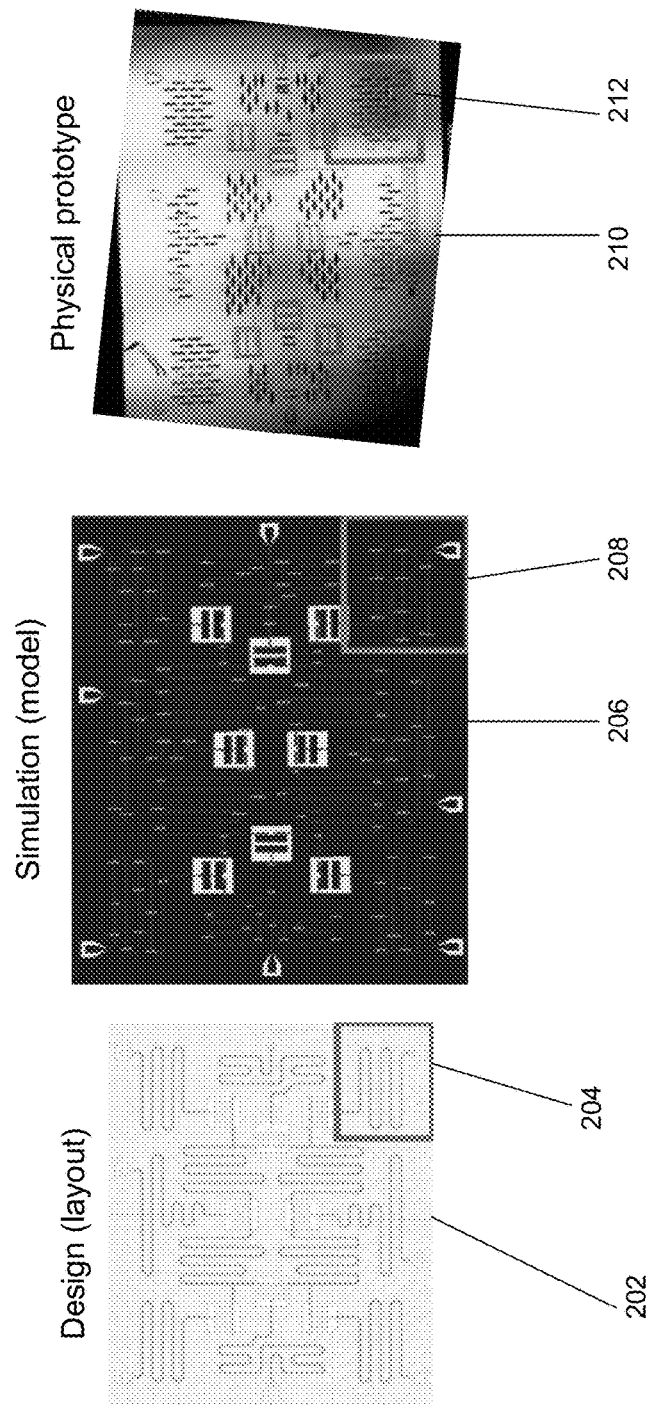
FIG. 2 illustrates the three phases of design, simulation and prototype in accordance with one or more embodiments described herein.

FIG. 2 illustrates the three phases of design, simulation and prototype in accordance with one or more embodiments described herein. The quantum chip 202 can be a chip that ideally utilizes a clean quality signal without noise or any interruptive crosstalk that could skew the functionality of the circuit. The square 204 represents the initial locations of MSS placement identified by the design specification. The simulation model of the quantum chip 202 is represented in 206 and the same MSS located in the design are exported to the precise identical locations 208 in the simulation model employing the steps described herein with reference to FIG. 1 and other figures and corresponding text. Chip 210 represents the actual physical prototype with the MSS installed in the locations 212 identified in the design and tested in the simulation employing the steps described herein with reference to FIG. 1 and other figures and corresponding text.

Figure 3:
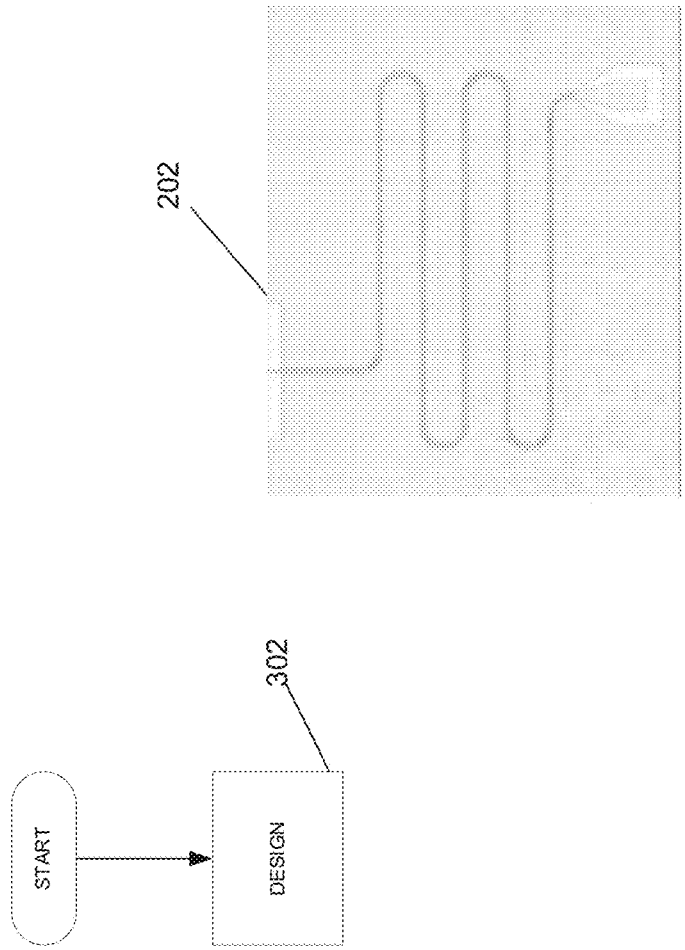
FIG. 3 illustrates example chip design (layout) phase in accordance with one or more embodiments described herein.

FIG. 3 illustrates example chip design phase in accordance with one or more embodiments described herein. Repetitive description of like elements employed in other embodiments described herein is omitted for sake of brevity.

Block 302 refers to the initial design (layout) phase of the quantum chip 204. The design (layout) phase is that which is shown in FIG. 2 for quantum chip 202. The design (layout) phase can achieve its functional purpose and guide coherent and accurate placement of potential MSS, satisfying fabrication constraints. A unique description of MSS is employed for the design phase, including various possible implementations. MSS examples are, but are not limited to them: wire-bonds, short and thin wires (e.g., usually less than 1 mm long and 25 um diameter), TSV, through silicon vias, and airbridges: similar to wire-bonds but implemented with a lithographic process. This phase can be significant as a poor initial design may lead to unnecessary multiple iterative simulation cycles. Typically for design, a GDS file from Klayout, Cadence or a similar design tool would be sufficient to accomplish such task.

Figure 4:
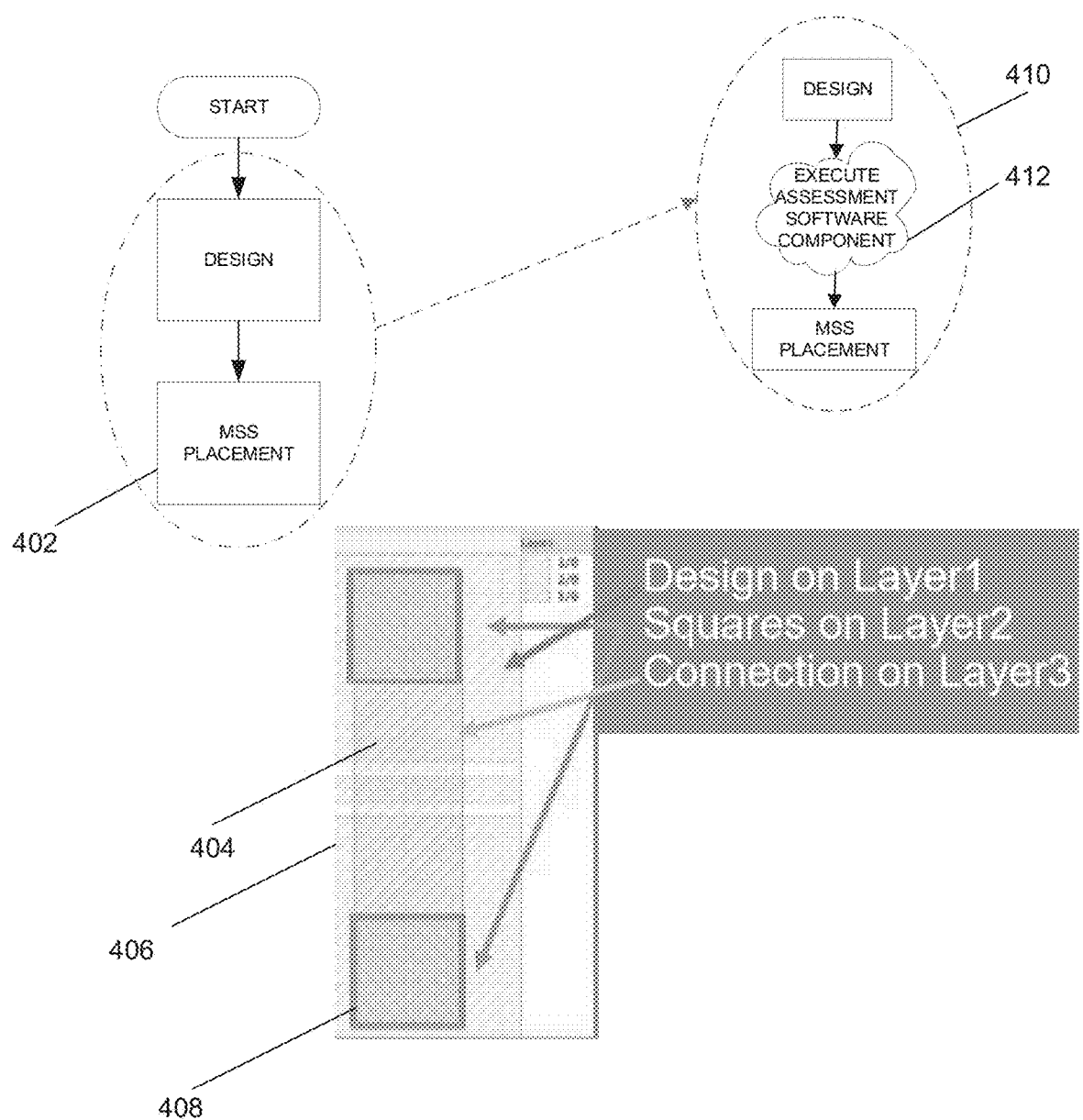
FIG. 4 illustrates the placement of MSS on the chip and the criteria involved in accordance with one or more embodiments described herein.

FIG. 4 illustrates placement of mode suppression structures on a quantum chip and criteria involved in accordance with one or more embodiments described herein. Repetitive description of like elements employed in other embodiments described herein is omitted for sake of brevity.

In some embodiments, FIG. 4 illustrates the MSS placement process (402) by implementing a GDS (Graphic Database System) file, where on layer 1 (406) there is an actual design (layout), on layer 2 (408) a couple of squares are placed to implement left and right coordinates of the MSS (landing pads), and a simple rectangle on layer 3 (404) is a connection section. With regard to the description of MSS in CPW, it can be considered that two significant principles are needed to describe most if not all possible implementations. The first is that there are two squares (associated with starting and ending points of the structure orthogonal to the CPW line). The second is that one rectangle will connect the two squares previously defined (this will provide electrical connectivity to keep lateral ground planes at the same potential). Placement of these components can be automated (e.g., can be tested in Klayout using a Ruby script) in order to take into account fabrication/design constraints. The functional components involved in this process are displayed in a detailed software functional module drawing shown as 410. The major component utilized for this process is assessment software component 412 that determines locations and precise placement for MSS on a coplanar waveguide of a quantum chip. If during verification/simulation crosstalk or an impact on qubits performance is detected, distance between MSS is reduced by half (and the number of MSS is consequently increased).

Figure 5:
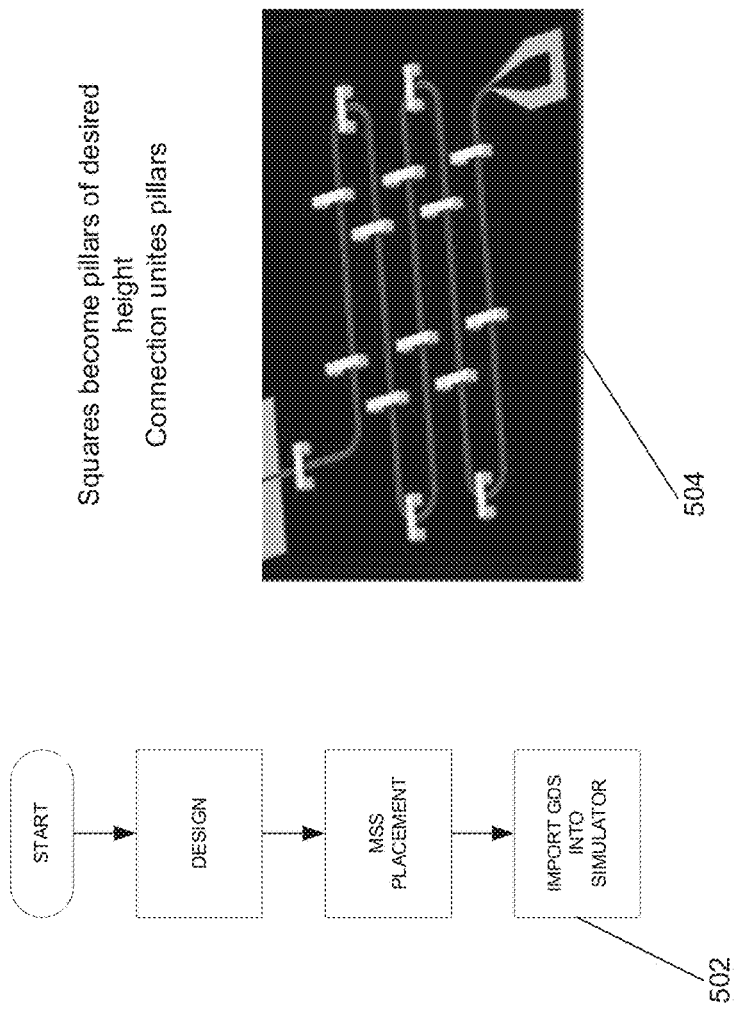
FIG. 5 illustrates the simulation phase and the process involved in accordance with one or more embodiments described herein.

FIG. 5 illustrates a simulation phase and the process involved in accordance with one or more embodiments described herein. In some embodiments, shown is the process of importing in the GDS file to the simulator 502 and conducting various simulations to analyze and make decisions based on performance data produced by the simulation. To allow exporting MSS locations precisely across differ software and file formats it is sufficient to implement MSS using two squares and one rectangle in GDS (Graphic Database System) format, which is supported by almost all design, layout and simulation tools currently. A script can be used for placing and importing the description of MSS in one or more software. Diagram 504 reflects how various MSS can be implemented in a simulator. Wire-bonds are extruded along the vertical direction and rectangles are shifted by the same amount to implement 3D structures (can be a common procedure in a modern simulator) and airbridges are implemented similarly to wire bonds. TSV can be extruded along vertical direction (positive or negative depending on TSV technology) and if there is top or bottom ground plane, the rectangular connection can be used.

Figure 6:
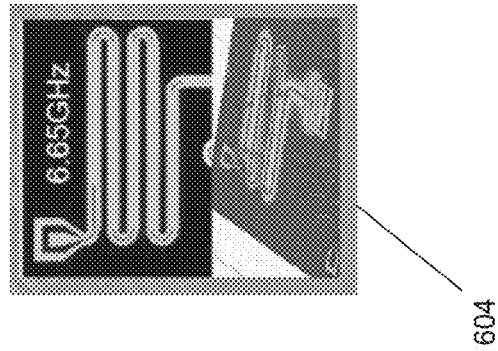
FIG. 6 illustrates the simulation data analysis phase on the circuit and the parameters involved in accordance with one or more embodiments described herein.
Figure 6:
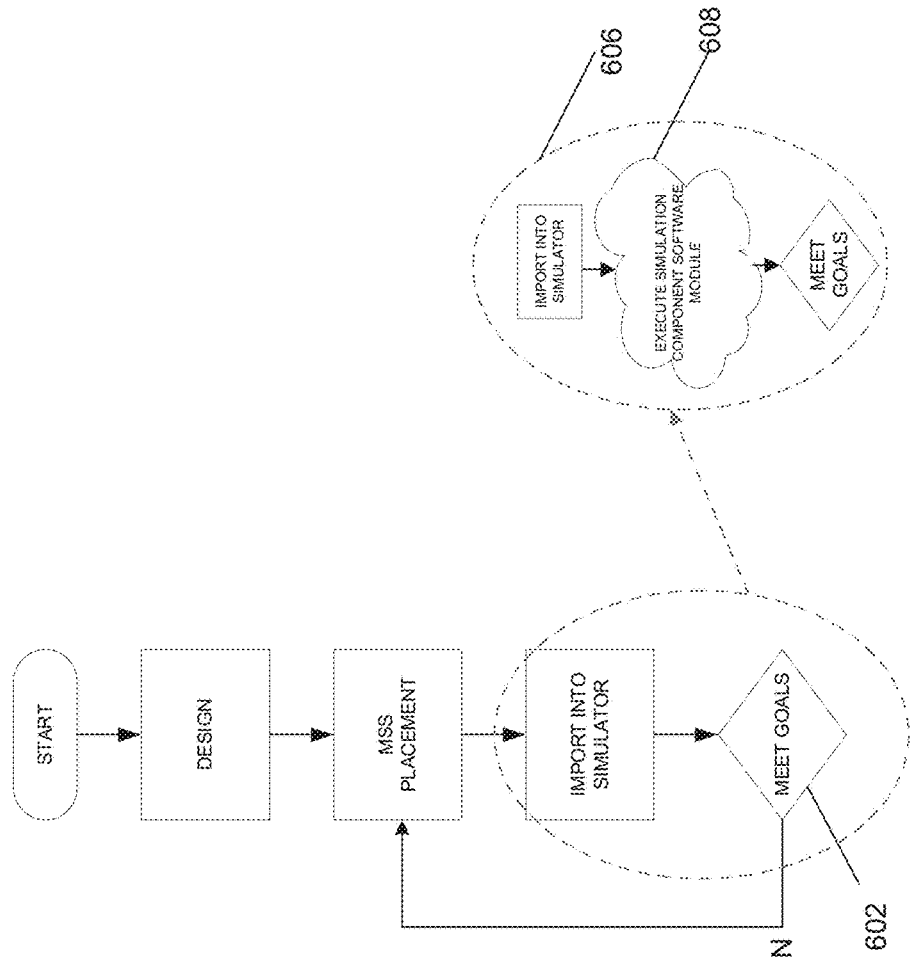

FIG. 6 illustrates a simulation data analysis phase on a quantum circuit and parameters involved in accordance with one or more embodiments described herein. In some embodiments, FIG. 6 illustrates the flowchart iterative process of determining if the simulation met objective performance goals. If the goals were not met, the process method would route the next step to reanalysis and replacement of the MSS. The final analysis from the simulation 604 would be based on whether or not specific design constraints such as resonators frequency, quality factor and crosstalk were met. The functional components involved in this process are displayed in a detailed software functional module drawing shown as 606. The major component utilized for this process is the software simulation component 608 that simulates the performance of a quantum chip based on a subset of the mode suppression structures locations and parameters of the quantum chip and generates a mode suppression structures placement model which is assessed for key performance goals.

Figure 7:
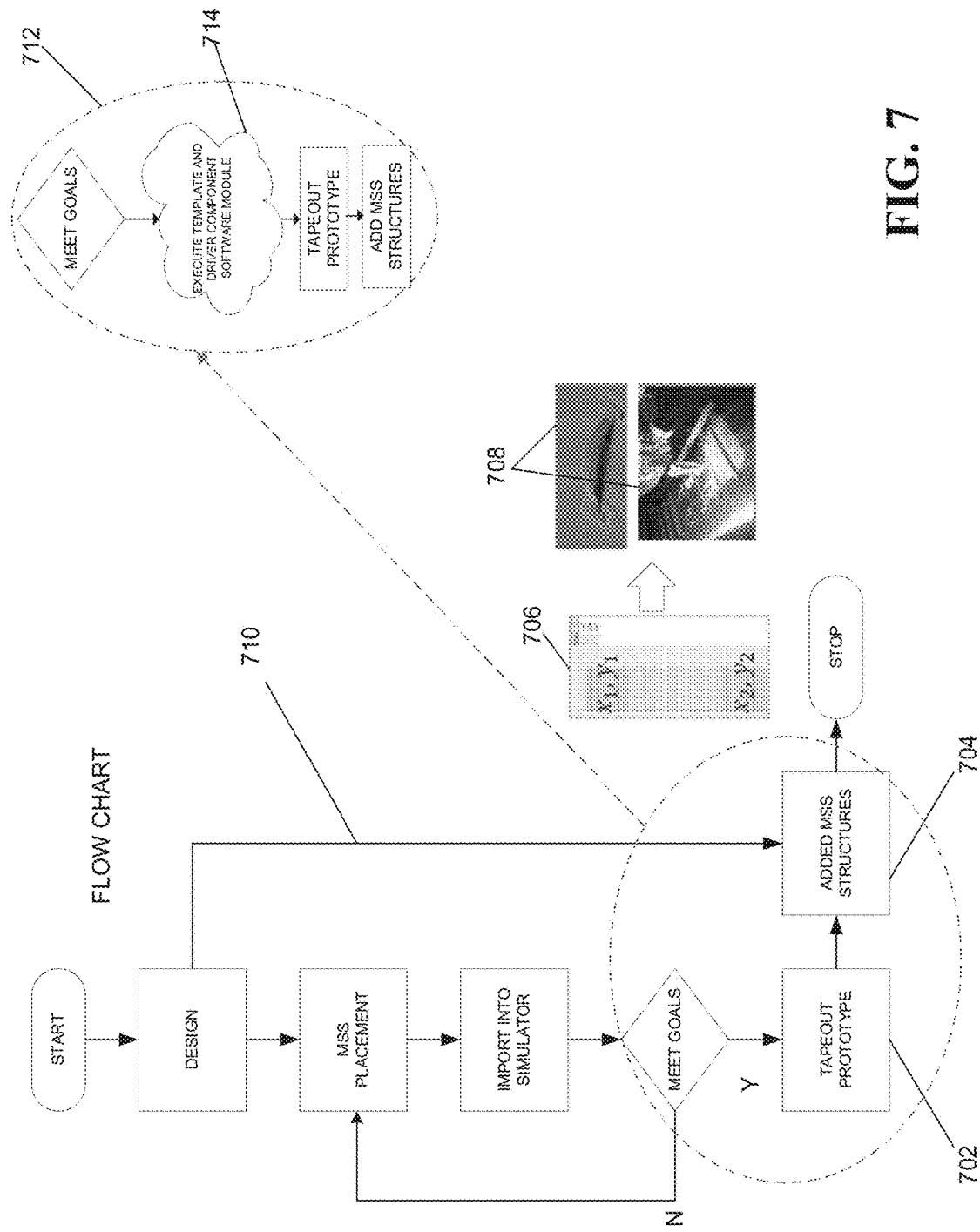
FIG. 7 illustrates a set of embodiments in steps with a focus on producing the prototype and adding the MSS in accordance with one or more embodiments described herein.

FIG. 7 illustrates a set of embodiments in steps with a focus on producing a prototype and adding the mode suppression structures in accordance with one or more embodiments described herein. In some embodiments, FIG. 7 illustrates a sequential step by step flow chart with the final focus on fabricating the chip with the precise MSS as intended. The final steps are producing the prototype 702 and then adding the MSS 704 after or during the fabrication process. The Fabrication is performed based on GDS (where MSS details are provided) and additional MSS (like wire bonds) are added using an auto-bonder 708 and x1,y1 and x2,y2 coordinates 706 (e.g., based on center of one or more squares). The final product indicates the MSS locations match the locations identified in the design and placement 710. The functional components involved in this process are displayed in a detailed software functional module drawing shown as 712. The major components utilized for this process are the template and driver component software modules 714. The template component software module generates a template of specific coordinates for placement of the subset of mode suppression structures on the quantum chip based on the mode suppression structures model and the driver component software module employs the template to drive an auto-bonder to install respective mode suppression structures on the quantum chip at locations defined by the template.

Figure 8:
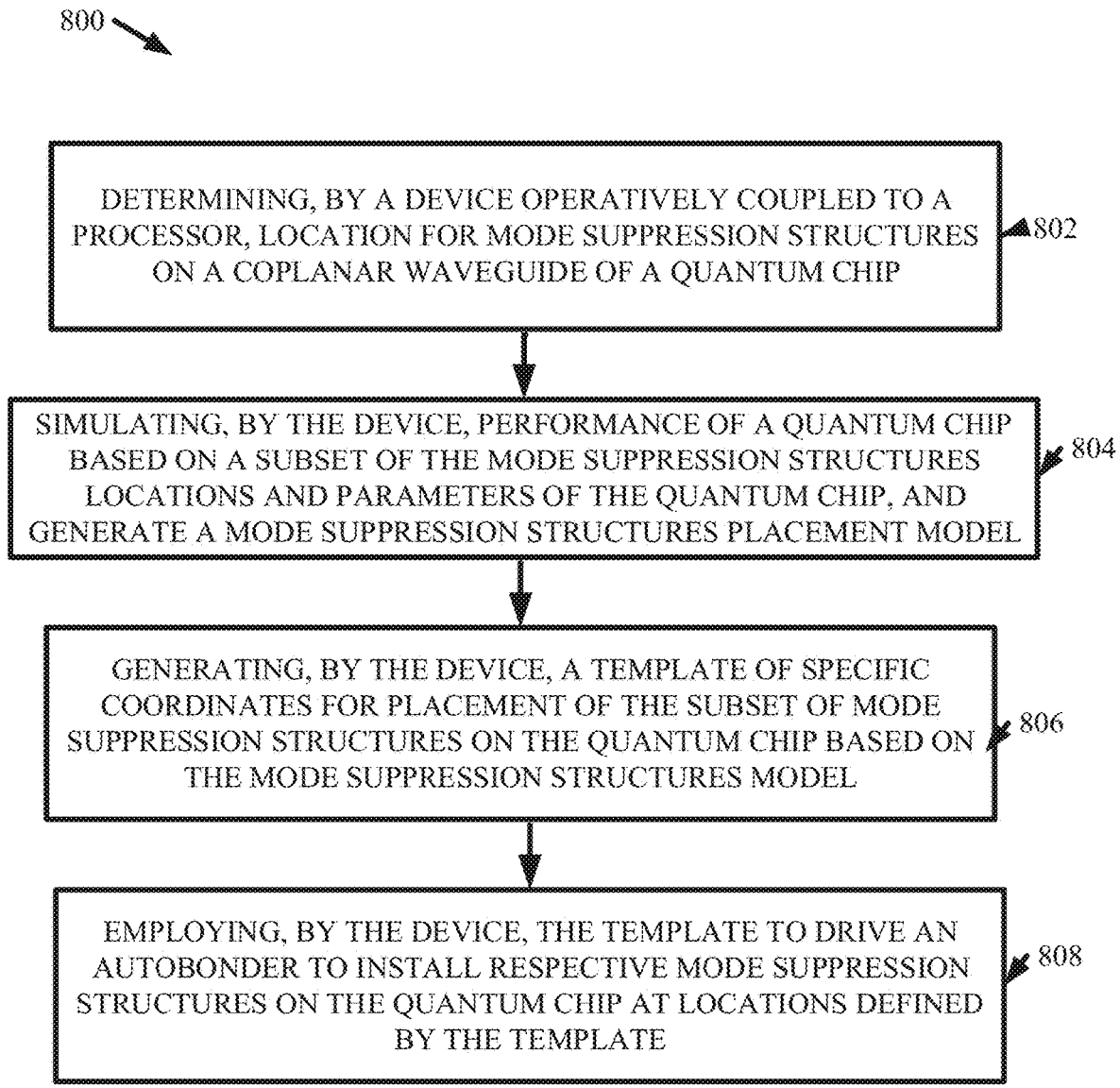
FIG. 8 illustrates a flowchart of a comprehensive automated placement methodology that provides coherent locations for MSS between design, simulation and prototypes in accordance with one or more implementations described herein.

FIG. 8 illustrates the flowcharts of automated placement methodology that provide coherent locations for Mode Suppression Structures (MSS) between design, simulation and prototypes in accordance with one or more implementations described herein. At 802, method 800 can comprise determining, by a device operatively coupled to a processor, location for mode suppression structures on a coplanar waveguide of a quantum chip. At 804, method 800 can comprise simulating, by the device, performance of a quantum chip based on a subset of the mode suppression structures locations and parameters of the quantum chip, and generate a mode suppression structures placement model. At 806, method 800 can comprise generating, by the device, a template of specific coordinates for placement of the subset of mode suppression structures on the quantum chip based on the mode suppression structures model. At 808, method 800 can comprise employing, by the device, the template to drive an auto-bonder to install respective mode suppression structures on the quantum chip at the specific coordinates defined by the template.

In some embodiments, the computer-implemented method can include placing, by the device, respective ones of the mode suppressing structures at same locations relative to a design layout, simulation model layout and physical layout.

In some embodiments, the computer-implemented method can include defining, by the device, locations for the mode suppression structures in the design layout as a function of rules associated with properties of the mode suppression structures, the coplanar waveguide and the quantum chip.

In some embodiments, the computer-implemented method can include importing, by the device, the locations of the mode suppression structures from the design layout into the simulation component; and employing, by the device, a simulation to determine if the placement of the subset of the mode suppression structures satisfies design specifications.

In some embodiments, the computer-implemented method can include generating, by a device, a tape-out set of coordinates corresponding to locations for the subset of the mode suppression structures from a design layout and simulation; and employing, by the device, an auto-bonder to physically place the subset of the mode suppression structures based on the tape-out set of coordinates.

Figure 9:
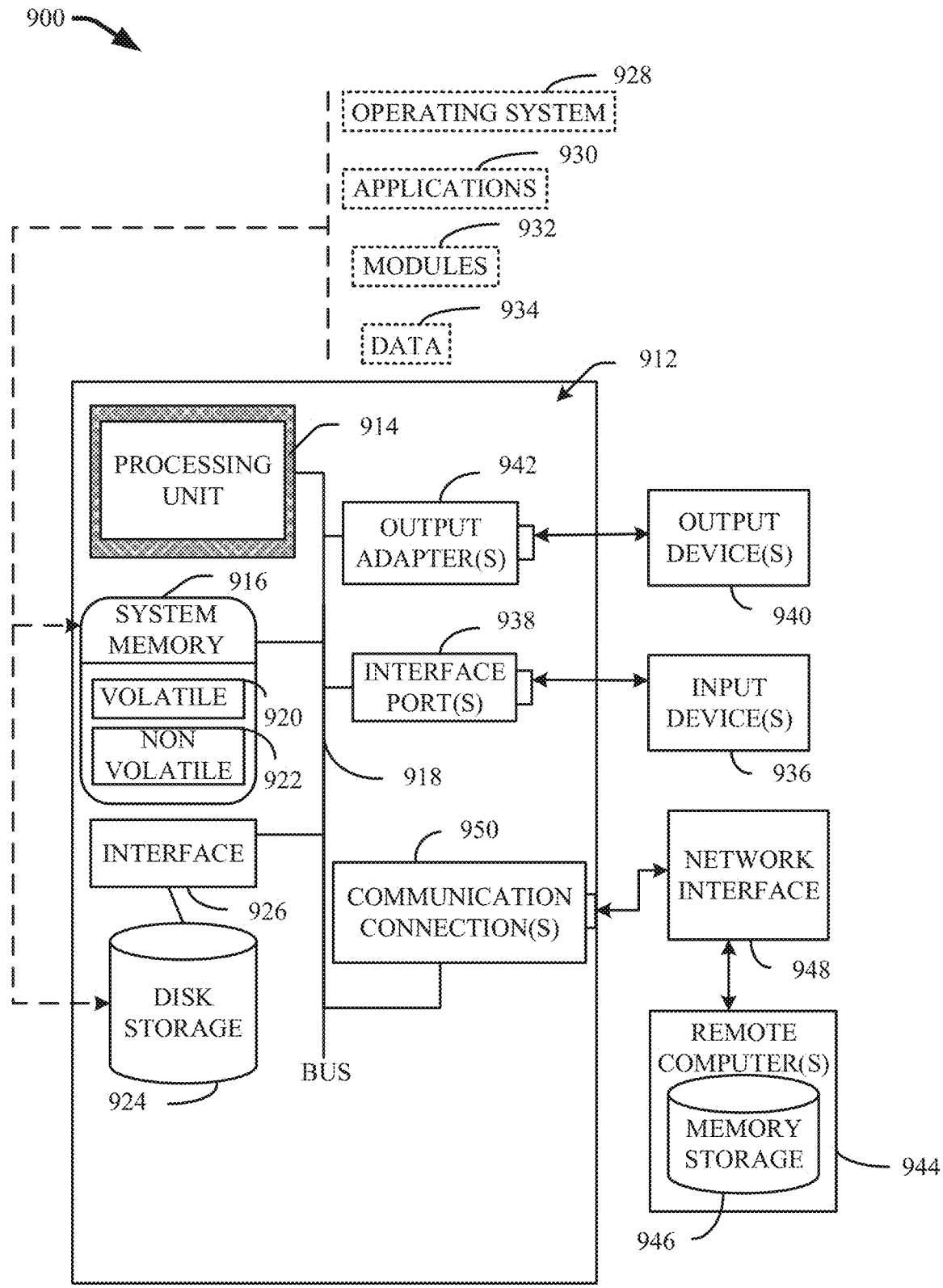
FIG. 9 is a schematic diagram of an example operating environment in accordance with one or more implementations described herein.

To provide context for the various aspects of the disclosed subject matter, FIG. 9 as well as the following discussion are intended to provide a general description of a suitable environment in which the various aspects of the disclosed subject matter can be implemented. FIG. 9 illustrates a block diagram of an example, non-limiting operating environment in which one or more embodiments described herein can be facilitated. Repetitive description of like elements employed in other embodiments described herein is omitted for sake of brevity.

A suitable operating environment 900 for implementing various aspects of this disclosure can also include a computer 912. The computer 912 can also include a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914. The system bus 918 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1094), and Small Computer Systems Interface (SCSI). The system memory 916 can also include volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable programmable ROM (EEPROM), flash memory, or nonvolatile random-access memory (RAM) (e.g., ferroelectric RAM (FeRAM). Volatile memory 920 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 912 can also include removable/non-removable, volatile/non-volatile computer storage media. FIG. 9 illustrates, for example, a disk storage 924. Disk storage 924 can also include, but is not limited to, devices like a magnetic disk drive, floppy disk drive, tape drive, Jaz drive, Zip drive, LS-100 drive, flash memory card, or memory stick. The disk storage 924 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 924 to the system bus 918, a removable or non-removable interface is typically used, such as interface 926. FIG. 9 also depicts software that acts as an intermediary between users and the basic computer resources described in the suitable operating environment 901. Such software can also include, for example, an operating system 928. Operating system 928, which can be stored on disk storage 924, acts to control and allocate resources of the computer 912. System applications 930 take advantage of the management of resources by operating system 928 through program modules 932 and program data 934, e.g., stored either in system memory 916 or on disk storage 924. It is to be appreciated that this disclosure can be implemented with various operating systems or combinations of operating systems. A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port can be used to provide input to computer 912, and to output information from computer 912 to an output device 940. Output adapter 942 is provided to illustrate that there are some output devices 940 like monitors, speakers, and printers, among other output devices 940, which require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a computer, a server, a router, a network PC, a workstation, a microprocessor based appliance, a peer device or other common network node and the like, and typically can also include many or all the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 950 refers to the hardware/software employed to connect the network interface 948 to the system bus 918. While communication connection 950 is shown for illustrative clarity inside computer 912, it can also be external to computer 912. The hardware/software for connection to the network interface 948 can also include, for exemplary purposes only, internal and external technologies such as, modems including regular telephone grade modems, cable modems and DSL modems, ISDN adapters, and Ethernet cards.

Embodiments of the present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in one or more computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that one or more blocks of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, one or more blocks in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that one or more block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a server computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems, computer program products, and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
  a memory that stores computer executable components;
  a processor that executes the computer executable components stored in the memory, wherein the computer executable components comprise:
    a template component that generates a template that defines specific coordinates for placement of mode suppression structures on a coplanar waveguide of a quantum chip based on a mode suppression structures placement model; and
    a driver component that employs the template to drive an auto-bonder to install the mode suppression structures on the coplanar waveguide of the quantum chip at the specific coordinates.

2. The system of claim 1, wherein the specific coordinates based on the mode suppression structures placement model comprises distances between the mode suppression structures as a function of frequency of qubits of the quantum chip.

3. The system of claim 1, wherein the specific coordinates based on the mode suppression structures placement model are selected to suppress slot line modes.

4. The system of claim 1, wherein the specific coordinates based on the mode suppression structures placement model are selected to mitigate crosstalk.

5. The system of claim 1, wherein the specific coordinates based on the mode suppression structures placement model are selected to mitigate resonator losses.

6. The system of claim 1, wherein the specific coordinates based on the mode suppression structures placement model are selected as a function of rules associated with properties of the mode suppression structures, the coplanar waveguide, and the quantum chip.

7. The system of claim 1, wherein the template component generates the template in a graphic database system (GDS) file format.

8. A computer-implemented method, comprising:
  generating, by a device operatively coupled to a processor, a template that defines specific coordinates for placement of mode suppression structures on a coplanar waveguide of a quantum chip based on a mode suppression structures placement model; and
  employing, by the device, the template to drive an auto-bonder to install the mode suppression structures on the coplanar waveguide of the quantum chip at the specific coordinates.

9. The computer-implemented method of claim 8, wherein the specific coordinates based on the mode suppression structures placement model comprises distances between the mode suppression structures as a function of frequency of qubits of the quantum chip.

10. The computer-implemented method of claim 8, wherein the specific coordinates based on the mode suppression structures placement model are selected to suppress slot line modes.

11. The computer-implemented method of claim 8, wherein the specific coordinates based on the mode suppression structures placement model are selected to mitigate crosstalk.

12. The computer-implemented method of claim 8, wherein the specific coordinates based on the mode suppression structures placement model are selected to mitigate resonator losses.

13. The computer-implemented method of claim 8, wherein the specific coordinates based on the mode suppression structures placement model are selected as a function of rules associated with properties of the mode suppression structures, the coplanar waveguide, and the quantum chip.

14. The computer-implemented method of claim 8, wherein the template is in a graphic database system (GDS) file format.

15. A computer program product comprising a computer readable storage medium having program instructions embodied therewith, the program instructions executable by processor to cause the processor to:

generate a template that defines specific coordinates for placement of mode suppression structures on a coplanar waveguide of a quantum chip based on a mode suppression structures placement model; and employ the template to drive an auto-bonder to install the mode suppression structures on the coplanar waveguide of the quantum chip at the specific coordinates.

16. The computer program product of claim 15, wherein the specific coordinates based on the mode suppression structures placement model comprises distances between the mode suppression structures as a function of frequency of qubits of the quantum chip.

17. The computer program product of claim 15, wherein the specific coordinates based on the mode suppression structures placement model are selected to suppress slot line modes.

18. The computer program product of claim 15, wherein the specific coordinates based on the mode suppression structures placement model are selected to mitigate crosstalk.

19. The computer program product of claim 15, wherein the specific coordinates based on the mode suppression structures placement model are selected to mitigate resonator losses.

20. The computer program product of claim 15, wherein the specific coordinates based on the mode suppression structures placement model are selected as a function of rules associated with properties of the mode suppression structures, the coplanar waveguide, and the quantum chip.

* * * * *